United States Patent [19]

Robinson

[11] 4,410,220

[45] Oct. 18, 1983

[54] GAS LUBRICATED BALL BEARING

[75] Inventor: Curtiss W. Robinson, Seattle, Wash.

[73] Assignee: The Boeing Company, Seattle, Wash.

[21] Appl. No.: 130,614

[22] Filed: Mar. 17, 1980

[51] Int. Cl.³ .............................................. F16C 32/06
[52] U.S. Cl. .............................. 384/109; 308/DIG. 1;
308/189 R
[58] Field of Search ...................... 308/DIG. 1, 9, 189,
308/122, 170, 172; 33/DIG. 2

[56] References Cited

U.S. PATENT DOCUMENTS

| | | | |
|---|---|---|---|
| 2,695,198 | 11/1954 | Brugger | 308/9 |
| 2,998,999 | 9/1961 | Morser et al. | 308/122 |
| 3,005,666 | 10/1961 | Morser et al. | 308/122 |
| 3,137,531 | 6/1964 | Herrmann et al. | 308/9 |
| 3,308,848 | 3/1967 | Johnson et al. | 308/170 |
| 3,314,336 | 4/1967 | Jorgji | 308/9 |
| 3,380,788 | 4/1968 | Wilcock | 308/9 |
| 3,455,155 | 7/1969 | Greenberg et al. | 308/9 |
| 3,537,324 | 11/1970 | Evans | 308/9 |
| 3,874,749 | 4/1975 | Maniak | 308/9 |
| 4,019,392 | 4/1977 | Zamfiroscu | 308/9 X |

FOREIGN PATENT DOCUMENTS 912007  5/1954  Fed. Rep. of Germany ... 308/DIG. 1

Primary Examiner—Harry N. Haroian
Attorney, Agent, or Firm—Delbert J. Barnard

[57] ABSTRACT

Lubrication gas for a steel ball is delivered to the ball by a gas distribution manifold ring that surrounds an upper portion of the ball. Such ring presents an annular seat directed towards the ball and includes gas delivery orifices directed to discharge against the ball. Gas under pressure is delivered through the orifices, to provide a lubricating gas film between the seat and the ball, attended by downwardly directed fluid forces acting on the ball. A pressure chamber is provided below the ball. A regulated gas pressure is maintained within such chamber during pressurization of the bearing, for pressure loading the ball upwardly towards the bearing seat. A support pad ring is provided below the ball to support the ball during those times that the bearing is not pressurized and to preposition the ball to allow pressurization of the chamber below the ball by restricting the gap between the ball and the seat elements.

10 Claims, 2 Drawing Figures

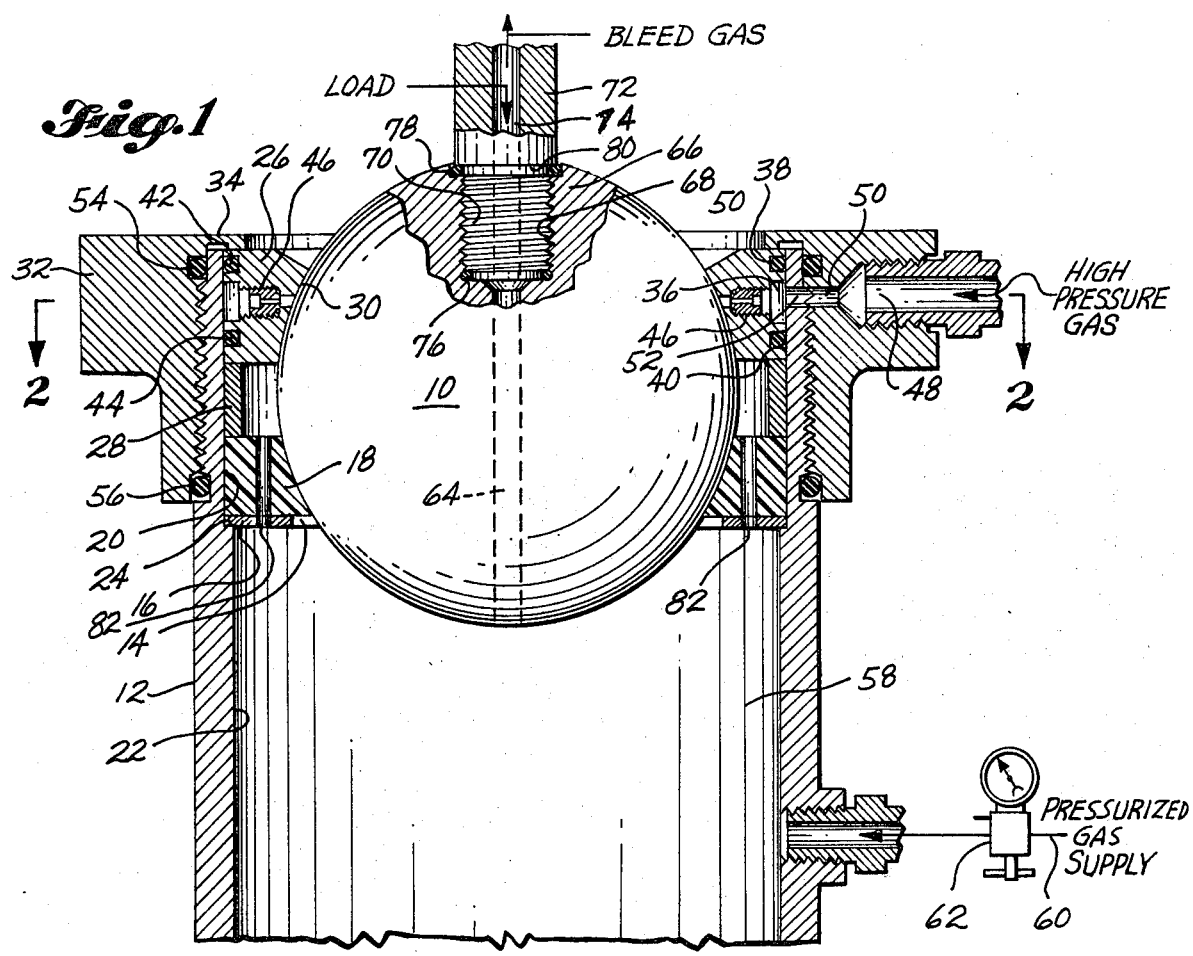
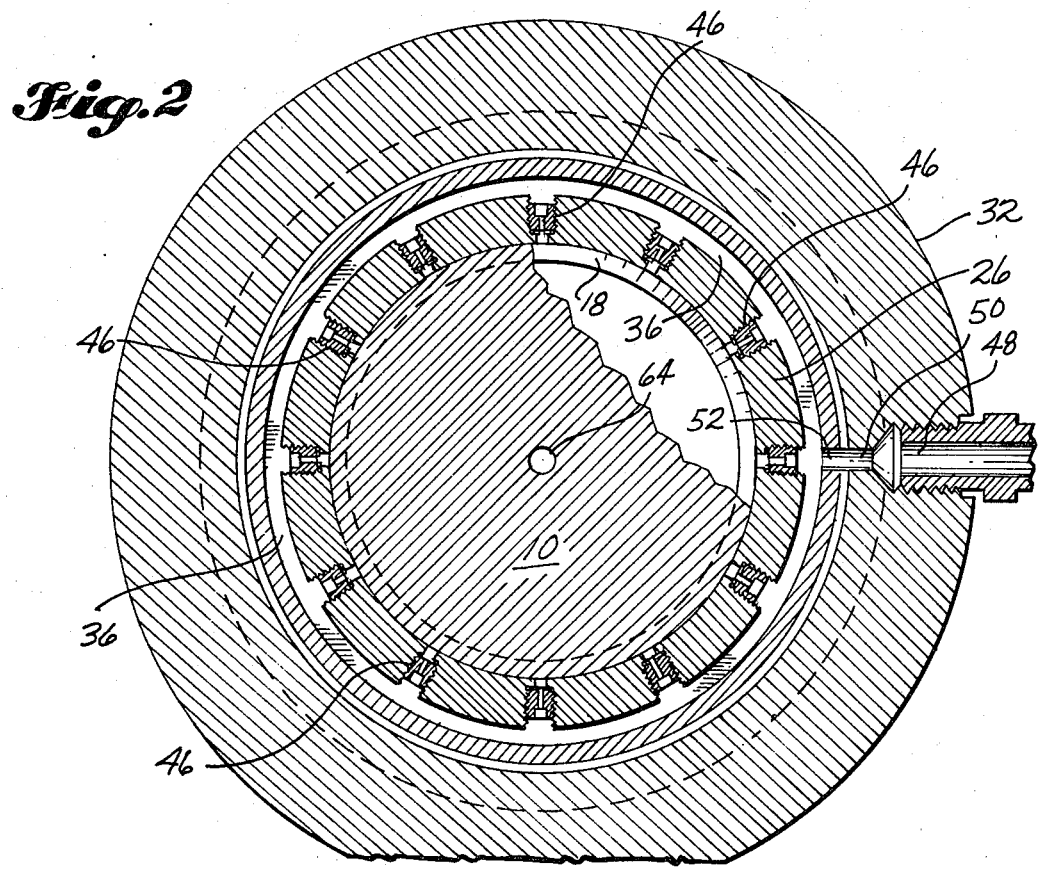

GAS LUBRICATED BALL BEARING

BACKGROUND OF THE INVENTION

1. Field of the Invention

This invention relates to gas lubricated bearings. More particularly, it relates to the provision of an improved gas lubricated bearing of a type comprising a load supporting spherical ball and a single gas distribution ring for providing a bearing seat and for supplying a lubricating gas film between the ball and the seat.

2. Description of the Prior Art

One known type of gas lubricated bearing comprises a large diameter steel ball and a single gas distribution ring which surrounds a lower portion of the ball. The inner annular surface of the ring is lapped or otherwise machined to provide a bearing seat which matches the curvature of the ball. The ring is formed to include a plurality of gas delivery orifices which are directed to discharge against the ball.

A disadvantage of this type of known gas lubricated bearing is that for many loads it requires the use of a relatively large diameter ball. For example, in spacecraft control test vehicle suspensions wherein the ball is a part of a support for a model spacecraft or the like which is being tested, the loads encountered sometimes make it necessary to use a ball as large as sixteen inches (16") in diameter. Steel balls of this size are not commercially available and must be specially manufactured. Also, either a very large ball or very high float pressures are necessary to sustain a large vertical gravity load from a heavy model on a conventional gas spherical bearing.

Ball type gas lubricated bearings which can be found in the patent literature are disclosed by the following U.S. patents: No. 2,998,999 granted Sept. 5, 1961, to Calvin S. Morser, Robert E. Maloney and Conrad H. Benoit; No. 3,005,666, granted Oct. 26, 1961 to Calvin S. Morser, Robert E. Maloney and Conrad H. Benoit; No. 3,308,848, granted Mar. 14, 1967, to Harold I. Johnson and Orrin A. Wobig; No. 3,314,336, granted Apr. 18, 1967, to Bernard Jorgji; No. 3,380,788, granted Apr. 30, 1968, to Donald F. Wilcock; No. 3,455,155, granted July 15, 1969 to Myron L. Greenberg and Daniel J. Kolesar; and No. 3,537,324, granted Nov. 3, 1970, to John L. Evans.

SUMMARY OF THE INVENTION

A principal object of the present invention is to provide a gas lubricated bearing of a type which includes a steel ball adapted to support a load for three degrees of angular movement and a single gas distribution ring with orifices for delivering a lubricating gas to the ball.

According to my invention, the gas distribution ring is positioned above rather than below the ball and a source or regulated gas pressure is provided in a chamber below the ball for pressure loading or biasing the ball upwardly towards the bearing seat.

One advantage of my gas bearing in comparison with conventional gas bearings in which the gas distribution ring is located below the ball is that my bearing can support a given load with a much smaller steel ball than must be used in the conventional bearing. My bearing is capable of supporting, with a steel ball measuring about three to six inches in diameter, a load in which the conventional bearing might require a sixteen inch diameter ball. The smaller diameter steel balls are commercially available whereas the larger diameter steel or aluminum balls must be specially manufactured.

An additional advantage of my gas lubricated bearing is that it permits bearing vertical stiffness to be adjusted to a maximum value independently of the static, gravitational mass or other load on the bearing. This adjustment can be simply obtained by controlling the regulated pressure within the chamber below the steel ball.

Other features, objects and advantages of my gas lubricated bearing will be apparent from the illustrated embodiment that is shown in the drawing and described below.

BRIEF DESCRIPTION OF THE DRAWING FIGURES

FIG. 1 is a vertical sectional view of a gas lubricated bearing constructed according to my invention, with a section of the steel ball and supporting structure shown in side elevation; and FIG. 2 is a sectional view taken through FIG. 1, substantially along line 2—2 of FIG. 1.

DESCRIPTION OF THE PREFERRED EMBODIMENT

As shown by FIG. 1 of the drawing, my bearing includes a spherical ball 10 which is mounted for three degrees of angular freedom at the top end of a vertically oriented tubular housing 12. Ball 10 sits down on and is supported by a pad ring 14 when the bearing is not pressurized. Pad ring 14 comprises a lower support portion 16 constructed from a hard material and an upper pad portion 18 constructed from a softer material which will not scar the ball surface on contact. The central opening formed in pad ring 14 is smaller in diameter than the diameter of ball 10, so that ball 10 can not pass through pad ring 14.

The interior of housing 12 may be machined to provide a first diameter upper portion 20 and a smaller diameter lower portion 22, defining a shoulder 24 where they meet. Pad ring 14 may be sized to snuggly fit within the upper portion and to sit on the shoulder 24, as illustrated.

According to my invention, the ball 10 is lubricated by a gas film supplied by a gas distribution ring 26 which surrounds an upper portion of ball 10. As illustrated, a spacer ring 28 may set down onto the pad ring 14 and the gas distribution ring 26 may set down on the spacer ring 28.

Ring 26 includes an annular inner surface or bearing seat 30 which is machined (e.g. lapped) to conform to the curvature of ball 10. As clearly illustrated, the central opening in ring 26 is smaller that the ball 10, so the ball 10 cannot be forced upwardly through ring 26. However, ball 10 is free to drop downwardly away from contact with ring 26 into a position on the pad ring 14.

Preferably, the upper end of housing 12 is externally threaded so that it can receive an internally threaded closure nut 32 having an upper flange portion 34 positioned to contact the upper surface of ring 26 when the closure nut 32 is tightened down.

Ring 26 is formed to include a relatively large, centrally located circumferential groove 36 in its outer periphery which is flanked by smaller grooves 38, 40 in which O-rings 42, 44 are received. Groove 36 serves as a manifold for the lubricating gas and communicates with the outer ends of a plurality of radially directed gas delivery orifices 46 which are spaced circumferentially about ring 26. In accordance with conventional practice, the gas orifices 46 are formed in inserts of hard material which are set into drilled sockets formed in ring 26.

Closure nut 32 is formed to include a high pressure inlet port 48 which is adapted to be connected to a conduit (not shown) which conveys the high pressure lubricating gas from its regulated high pressure source. Opening 50 in closure nut 32 and opening 52 in the upper wall portion of housing 12 communicate port 48 with manifold 36. O-rings 54, 56 are provided above and below opening 52. These O-rings, 54, 56 may be carried by circumferential grooves formed in the inner wall of the closure nut 32, near the upper and lower ends thereof, as illustrated.

The lower portion of ball 10, up to the seat of the gas distribution ring 26, is exposed to a pressure chamber 58 which is defined by housing 12 below the ball 10. At the same time that high pressure gas is being delivered to the distribution ring 26, attended by downwardly directed fluid forces acting on the ball 10, a lower but elevated gas pressure is established, from an external regulated source, in chamber 58, to act against the lower surface of the ball 10 and to pressure-load or bias the ball 10 upwardly towards the bearing seat 30. As stated above, the pad ring 14 supports the ball 10 when the bearing is not pressurized. In addition, the pad ring 14 prepositions the ball 10 to allow pressurization of the chamber 58 below the ball 10 by restricting the gap between the ball 10 and the bearing seat 30.

The gas pressure within chamber 58 is a regulated pressure. This may be achieved by the normal practice of regulating the flow of pressurized gas into chamber 58, with a fixed outflow orifice or by regulating the flow of pressurized gas out from chamber 58 with a fixed inflow orifice. By way of example, a conduit 60 including pressure regulator 62 is shown delivering a regulated gas (e.g. air) pressure into chamber 58.

In preferred form, ball 10 includes a single, centrally drilled hole or passageway 64 for bleed gas flow. A load fitting 66 is provided on top of the ball 10, concentric with passageway 64. Fitting 66 may comprise an internally threaded socket 68 adapted to receive an externally threaded lower end portion 70 of a load carrying member or spud 72. Member 72 includes a central passageway 74 which forms a continuation of passageway 64. A first O-ring 76 may be provided at the base of the socket 68, between the socket end wall and the end of member 72. An alternate sealing design might use an O-ring 78, carried within an annular groove 80 formed in member 72.

One use of the gas bearing of my invention is to support spacecraft models to allow testing of their functional central circuits. The bleed gas passageways 64, 74 provides an easy way of delivering gas under pressure to the model which is supported on the support ember 72. The model may be equipped with a valve for regulating the flow of gas to it through bleed passageways 64, 74. The use of gas at the model does not adversely affect operation of the gas bearing. This is because any changes in pressure within chamber 58 caused by flow of gas to the model through bleed passageways 64, 74 is immediately sensed by the pressure regulator 62 and the necessary changes are made in the delivery rate of the gas to maintain the desired pressure within chamber 58.

Positioning of the gas distribution ring 26 above rather than below the ball 10 makes it possible to use a smaller diameter ball 10 and higher gas pressures at the bearing seat. Calculations indicate that a ball measuring three to six inches (both sizes are commercially available) in diameter in a gas lubricated bearing constructed according to my invention is capable of supporting a load that would require a sixteen inch diameter ball in a conventional bearing of the type in which the gas distribution ring is located below the ball. The large sized ball used in such a conventional bearing makes it necessary to support the model with the maximum pneumatic or pressurized gas sources normally available in aerospace laboratories.

Another advantage of my bearing is that bearing vertical stiffness can be adjusted to a maximum value independently of the static, gravitational mass, or other loads which are applied to the bearing. This adjustment can be simply obtained by controlling the loading pressure within the chamber 58.

Vertical vent openings 82 are provided in pad ring 14 so the chamber above ring 14 will be at the same pressure as chamber 58.

What is claimed is:

1. A gas lubricated bearing comprising:
a spherical ball;
means for applying a downwardly directed load onto the ball;
a gas distribution ring surrounding an upper portion of the ball, presenting an annular bearing seat directed towards the ball and including gas delivery orifices directed to discharge through individual passages against the ball;
means for supplying a gas under pressure through said orifices, to provide a lubricating gas film between the seat and the ball, attended by downwardly directed fluid forces acting on the ball;
a housing having a lower portion which defines a pressure chamber below the ball to which a substantial surface portion of the lower part of the ball is exposed;
means for providing a regulated gas pressure within said pressure chamber for pressure loading the ball towards the bearing seat; and
support pad means positioned below the center of the ball and spaced from the gas distribution ring to hold the ball sufficiently close to the annular seat when the bearing is not pressurized to preposition it so that the chamber below the ball can be pressurized.

2. A gas lubricated bearing according to claim 1, wherein the support pad means comprises a support pad ring of soft material positioned to encircle a lower portion of the ball.

3. A gas lubricated bearing according to claim 1, wherein said ball includes a fitting in its upper portion for receiving a load supporting member.

4. A gas lubricated bearing comprising:
a vertically disclosed tubular housing having an open upper end;
a support pad ring having an open center;
means mounting said support pad ring within the tubular housing at a location spaced below the upper end of the housing;
a spherical ball within the upper portion of said housing, including a lower part which projects downwardly through the open center of the support pad ring;
means for applying a downwardly directed load onto the upper part of the ball;
a lubricating gas distribution ring within said tubular housing, spaced above the support pad ring and surrounding an upper portion of the ball, said ring presenting an annular bearing seat directed towards the ball including gas delivery orifices directed to discharge through individual passages against the ball;

means for supplying a gas under pressure through said orifices to provide a lubricating gas film between the bearing seat and the ball, attended by downwardly directed fluid forces acting on the ball;

said housing defining a pressure chamber below the ball to which the surface portion of the ball below the gas bearing seat is exposed; and means for providing a regulated gas pressure within said pressure chamber for pressure loading the ball towards the bearing seat.

5. A gas lubricated bearing according to claim 4, wherein the tubular housing includes an internal shoulder on which the support pad ring is supported, said apparatus further includes a spacer ring which sets down onto the support pad ring, and wherein the gas distribution ring sets down on the spacer ring, and wherein said apparatus also includes a closure nut making threaded engagement with the upper exterior portion of said tubular housing, said closure nut including a top flange portion which when the nut is tightened down exerts a pressure on the top of the gas distribution ring, whereby the closure nut can be used for clamping the support pad ring, the spacer ring, the gas distrubution ring and the housing together.

6. A gas lubricated bearing according to claim 5, wherein the closure nut includes an inlet port for high pressure gas, and said closure nut and an upper side wall portion of the housing include passageways for communicating the inlet port with the gas delivery orifices in the gas distribution ring.

7. A gas lubricated bearing according to claim 4, wherein said ball includes a fitting in its upper portion for receiving a load supporting member.

8. A gas lubricated bearing according to claim 7, comprising a passageway extending diametrically through the ball, from its bottom to its top, and wherein the load supporting member also includes a passageway which communicates with the passageway in the ball, such passageways providing a way of delivering a gas from the pressure chamber below the ball to a use in the model or device held by the load supporting member.

9. A gas lubricated bearing comprising:
a spherical ball;
means for applying a downwardly directed load onto the ball;
a gas distribution ring surrounding an upper portion of the ball, presenting an annular bearing seat directed towards the ball and including gas delivery orifices directed to discharge through individual passages against the ball;
means for supplying a gas under pressure through said orifices, to provide a lubricating gas film between the seat and the ball, attended by downwardly directed fluid forces acting on the ball;
means defining a pressure chamber below the ball to which a substantial surface portion of the lower part of the ball is exposed, which defining means comprises a vertically directed tubular housing;
means for providing a regulated gas pressure within said pressure chamber for pressure loading the ball towards the bearing seat; and
a support pad ring of soft material supported within said housing and positioned to encircle a lower portion of the ball with the lower surface portion of the ball which is exposed to the regulated gas pressure within the chamber projecting downwardly through the open center of said support pad ring, said support pad ring serving to hold the ball when the bearing is not pressurized and to preposition it so that the chamber below the ball can be pressurized.

10. A gas lubricated bearing comprising:
a spherical ball including a fitting in its upper portion for receiving a load supporting member, and a passageway extending diametrically through the ball from its bottom to its top;
means for applying a downwardly directed load onto the ball, which means includes a load supporting member that has a passageway which communicates with the passageway in the ball;
a gas distribution ring surrounding an upper portion of the ball, presenting an annular bearing seat directed towards the ball and including gas delivery orifices directed to discharge through individual passages against the ball;
means for supplying a gas under pressure through said orifices, to provide a lubricating gas film between the seat and the ball, attended by downwardly directed fluid forces acting on the ball;
means defining a pressure chamber below the ball to which a substantial surface portion of the lower part of the ball is exposed; and
means for providing a regulated gas pressure within said pressure chamber for pressure loading the ball towards the bearing seat, the passageways in the ball and the load supporting member providing a way of delivering gas from the pressure chamber below the ball to a use in the model or test device held by the load supporting member.

* * * * *